United States Patent [19]

Miller et al.

[11] Patent Number: 4,776,464

[45] Date of Patent: Oct. 11, 1988

[54] AUTOMATED ARTICLE HANDLING SYSTEM AND PROCESS

[75] Inventors: Dale D. Miller, Seattle, Wash.; Kenneth S. Goldstein, Dallas, Tex.

[73] Assignee: BAE Automated Systems, Inc., Carrollton, Tex.

[21] Appl. No.: 745,030

[22] Filed: Jun. 17, 1985

[51] Int. Cl.⁴ .......................... B07C 3/14; B07C 3/18
[52] U.S. Cl. ..................................... 209/3.3; 209/583; 235/462; 235/471; 382/48; 382/61
[58] Field of Search ..................... 209/3.1–3.3, 209/583, 584; 235/470, 471, 462–464, 494; 382/48, 61

[56] References Cited

U.S. PATENT DOCUMENTS

| | | | |
|---|---|---|---|
| 3,074,634 | 1/1963 | Gamo | 235/462 |
| 3,639,728 | 2/1972 | Helfand et al. | 209/583 X |
| 3,645,391 | 2/1972 | Hirakawa et al. | 209/3.3 |
| 3,648,838 | 3/1972 | Hiromura | 209/3.3 |
| 3,752,312 | 8/1973 | Soltanoff | 209/583 X |
| 3,801,775 | 4/1974 | Acker | 235/471 X |
| 3,847,346 | 11/1974 | Dolch | 382/61 |
| 3,902,047 | 8/1975 | Tyler et al. | 235/471 |
| 4,058,217 | 11/1977 | Vaughan et al. | 209/583 X |
| 4,065,343 | 12/1977 | Stumpe | 209/3.3 X |
| 4,074,852 | 2/1978 | Wescott et al. | 235/463 |
| 4,403,339 | 9/1983 | Weyelsiep et al. | 382/61 X |
| 4,544,064 | 10/1985 | Felder | 235/471 X |

FOREIGN PATENT DOCUMENTS

0036149 9/1981 European Pat. Off. ............ 209/584

Primary Examiner—Robert B. Reeves
Assistant Examiner—Edward M. Wacyra
Attorney, Agent, or Firm—Kenneth R. Glaser

[57] ABSTRACT

An article handling system, particularly for baggage routing, has a tag affixed to each article of baggage, each tag bearing human and machine readable destination data disposed immediately adjacent to a uniquely configured target symbol of predetermined and known characteristics. Video cameras disposed adjacent to the baggage transport assembly are effective, in combination with control networks, to detect the target symbol and electronically read the destination data on the tags, so that the baggage can be routed along transport paths respectively corresponding to the intended destination of each article of baggage. The control network is also effective to transform the video image of the target to a desired orientation and configuration, as well as to select for processing the destination data viewed by the camera having the best image of the target.

10 Claims, 4 Drawing Sheets

AUTOMATED ARTICLE HANDLING SYSTEM AND PROCESS

The present invention relates generally to article handling, more particularly to baggage handling and routing, and even more particularly to an improved method and system for optically detecting and reading human readable destination data on tags affixed to the article or baggage.

There are many article handling applications requiring efficient and automated routing of the articles to respectively different locations. For example, in airline baggage handling systems, there is an ever increasing need for reducing the time in which passengers' baggage is processed and loaded on to the particular flights for the intended passenger destinations.

In an attempt to meet this need, various systems have been developed for automating the handling and transport of the baggage, none of the existing systems, however, being entirely suitable for all conditions of service. For example, many proposed baggage handling systems contemplate encoded data representative of the intended destination of the baggage being affixed or associated therewith, with various types of alternative detection devices utilized to decode the destination information and effect selective routing of the baggage to the desired locations. However existing systems, among other disadvantages, have not been successful in effectively meeting two major objectives desired by the airlines and/or users of the systems, namely: (1) that the machine readable encoded destination data also be human readable for the convenience of both the airline agents and the passengers and (2) that means be provided to rapidly identify and read the destination data under circumstances where the tags or substrates upon which the coded data is printed are randomly located and oriented.

It is therefore the principal object of the present invention to provide a new and improved method and system for article, and particularly baggage, handling.

It is another object of the present invention to provide a new and improved method and system for the automated transport and routing of articles and baggage in accordance with coded destination data associated with such articles and baggage.

It is a still further object of the present invention to provide the aforementioned automated handling and routing where the encoded data is in human readable form and capable of being detected and read when in various positions and orientations.

In accordance with these and other objects, the broad concept of the present invention contemplates the use of a tag or the like bearing encoded data, which is both machine and human readable, indicative of the intended destination of the particular article to which the tag is affixed or otherwise associated, the tag also bearing a uniquely configuredttarget symbol positioned adjacent the coded destination data to facilitate the detection and reading of the destination data by cameras or other appropriate sensing devices. Specific features of the invention, as well as additional objects and advantages thereof, will become more readily understood from the following detailed description taken in conjunction with the accompanying drawings, in which:

The drawings are not necessarily to scale, and in some instances portions have been exaggerated in order to emphasize the various features of the invention. Furthermore, the term "destination data", as used throughout the specification and claims, is to be construed in the broadest sense and includes any identifying indicia or the like which indicates the desired routing of the articles such as, in the case of baggage handling, flight data (airline i.d. and/or flight number), airport destination, etc.

Figure 1:
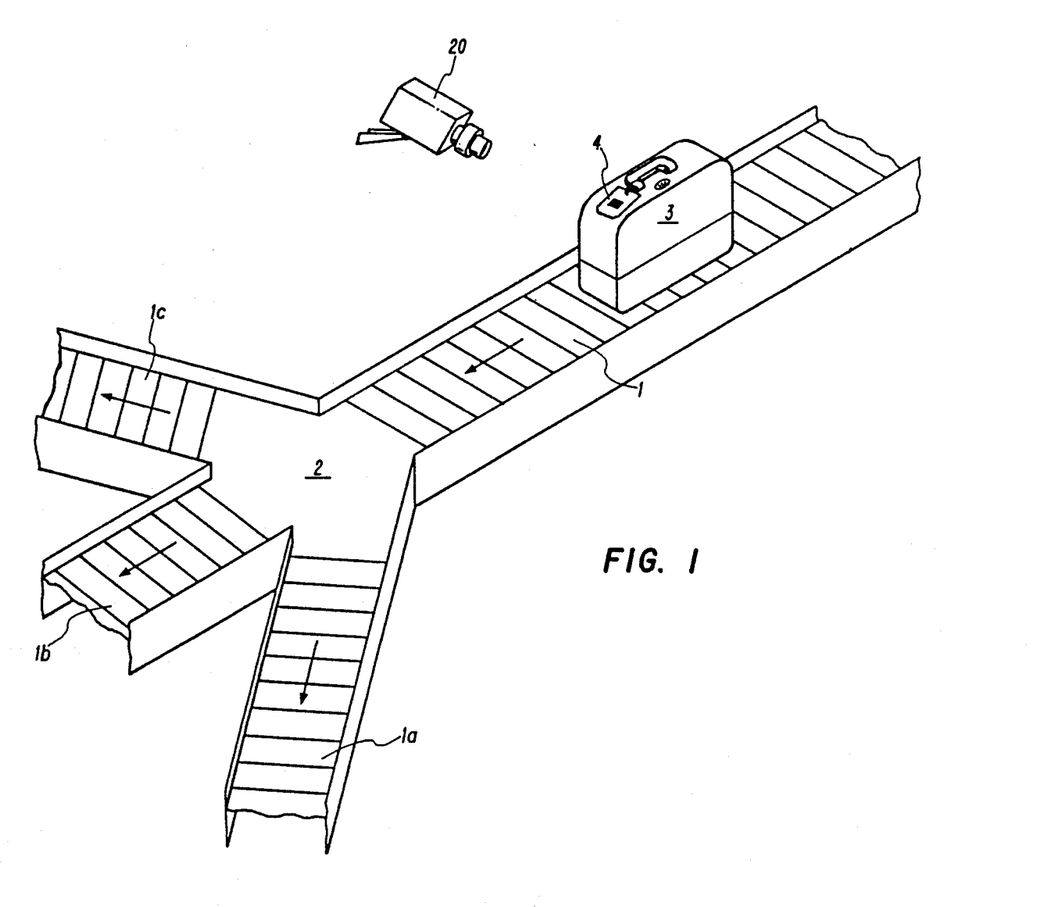
FIG. 1 is a diagrammatic representation of a baggage handling system for selectively transporting baggage to respectively different locations.

Referring initially to FIG. 1, one type of baggage handling conveyor assembly is diagrammatically depicted as including a main conveyor belt 1 with branch conveyers 1a, 1b, and 1c intersecting the main conveyor at a diverter location 2, the main and branch conveyors being motively powered to move at a constant rate in the direction of the arrows. This conveyor assembly is effective to transport various types of parcels and luggage, such as baggage piece 3, to the diverter location 2 where a conventional diverter (not shown) selectively directs the luggage to one of the branch conveyors 1a, 1b, or 1c in accordance with the intended destination of the particular luggage. For instance, in accordance with one illustrative example where the baggage handling conveyor assembly is used in an airport operation, each of the branch conveyors 1a, 1b, and 1c would transport the luggage to respectively different locations or "accumulation points" for loading on flights headed for various destinations.

It is to be understood that the baggage handling conveyor assembly does not in and of itself constitute a part of the present invention and can be any one of a number of types conventionally known in the art. Additionally, the type of conveyor assembly depicted in FIG. 1 is only illustrative, with the control of the present invention capable of being utilized with alternative or modified forms of conveyor assemblies. For example, the "branch" conveyors 1a, 1b, and 1c, instead of comprising movable belts, can be inclined chutes. Furthermore, while the particular conveyor assembly, and inventive control therefor, are described with respect to the transport of baggage, it will be clear that such can also be utilized for the transport of various types of packages and articles, for example in a mail sorting operation in which event the baggage piece 3 would be a mail sack.

Turning now to the process and control, and in accordance with the overall concept of the present invention, a luggage tag 4 is attached to the bag 3, the tag bearing a uniquely configured target symbol positioned adjacent data representative of the intended destination of the particular bag. One or more cameras 20 are positioned and focused to capture the pertinent information on the tag as it passes within the cameras' field of view at a location upstream of the diverter location 2. As subsequently described in greater detail, the destination information on the tag associated with each piece of luggage is then processed to actuate the diverter so that when the luggage reaches the diverter location 2, it is respectively directed along the correct path (1a, 1b, or 1c), in accordance with its intended destination.

Figure 2:
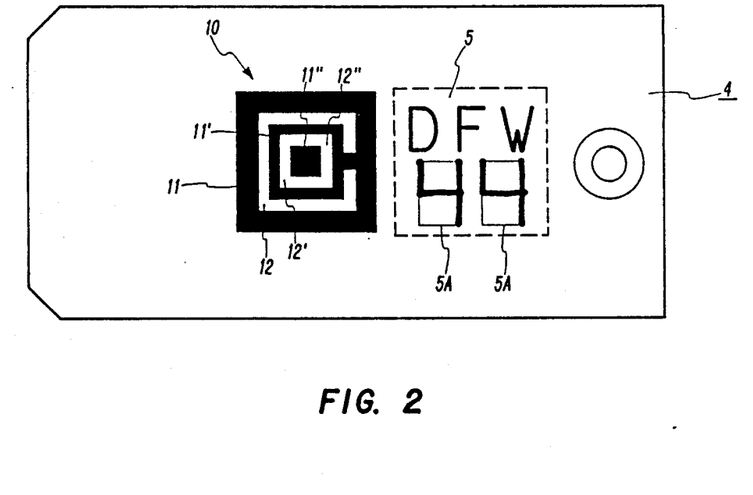
FIG. 2 is a depiction of one form of a baggage tag bearing the human readable destination data and a uniquely configured target symbol incorporating the features of the present invention.

In accordance with a unique feature of the invention, and with specific reference now to FIG. 2, each tag 4 has imprinted thereon a symbol or "target" 10 of predetermined and known characteristics, the target being positioned immediately adjacent an information field 5 containing the printed or written "intended destination" data. As hereinafter described in greater detail, the target 10 enables its (and therefore the tag's) real time identification/location by the computerized control of the present invention so that the destination data within the field 5 can be automatically read and processed.

In accordance with a preferred embodiment shown in FIG. 2, the target 10 is in the form of a square symbol having concentric squares which, when intersected by any line through its center, defines a sequence of bars (11, 11', 11", etc.) and spaces (12, 12", 12", etc.). Each of these bars and spaces has a specific predetermined width associated therewith so that, in the example shown, a scan line through the center of the symbol will intersect the bars and spaces in the respective ratios 2:1:1:3:1:1:2.

In accordance with the unique advantage of the present invention, and as a preferred embodiment thereof, the destination data within the field 5 can take the form of a combination of printed and hand-written alphanumeric figures, which not only affords the advantage of being human-readable, but which can be machine-readable by conventional optical character recognition (OCR) techniques. For example, as depicted in FIG. 2, the airport destination (DFW) can be preprinted with the specific flight number (44) hand-written by the agent at the departure point. As indicated in FIG. 2, lettering blocks 5A can be provided to serve as a constraint for the hand-written symbols, thus facilitating the OCR readings of such symbols.

Figure 3:
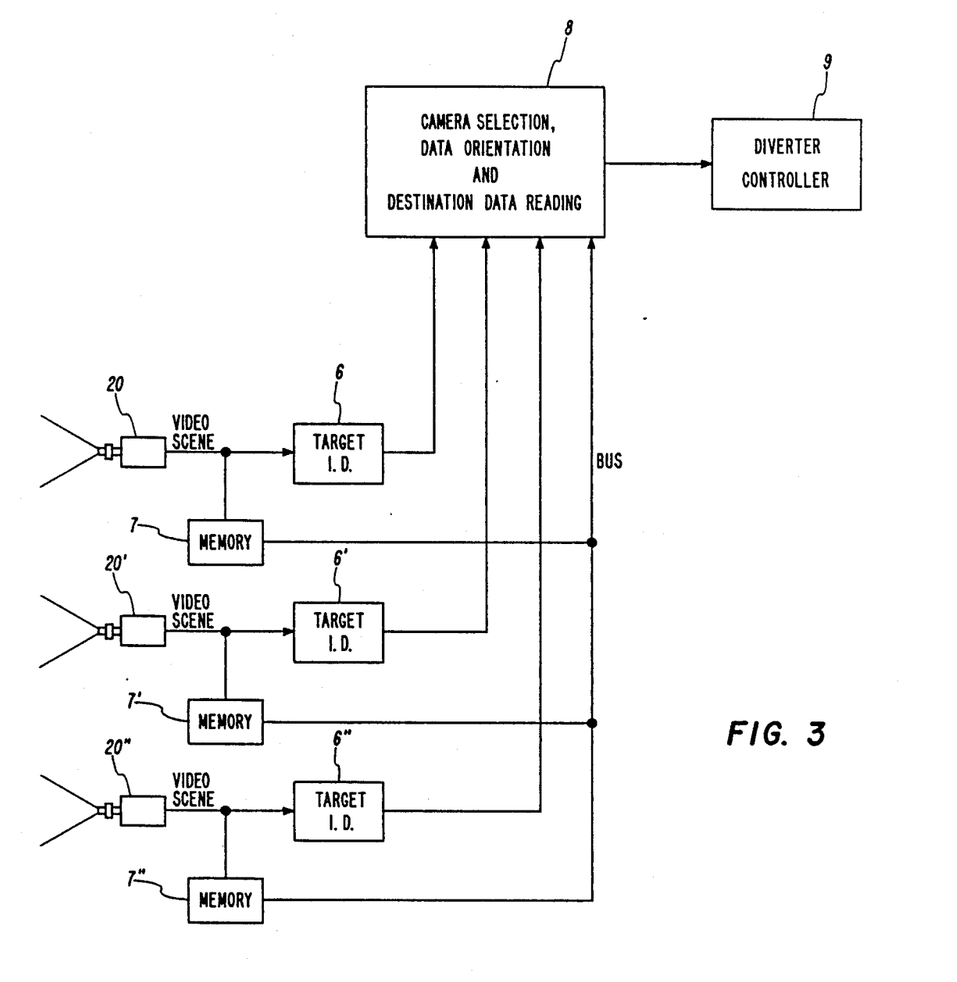
FIG. 3 is a simplified block diagram schematic of the overall system utilizing the concept of the present invention.

A simplified block diagram of the overall system for carrying out the unique process of the invention is depicted in FIG. 3 which illustrates, in this example, the use of three cameras 20, 20', and 20". While various types of cameras or sensors may be employed for the units 20, 20', and 20", including but not limited to area cameras or line scan cameras, in accordance with a preferred embodiment, the units 20, 20', and 20" comprise Model CCD1500R line scan cameras produced by Fairchild Camera and Instrument Corporation of Palo Alto, Calif.

The video scene data captured by each camera is routed to respectively associated target identification means (6, 6', 6"), such means being effective to detect and identify the target 10, and therefore signal the presence and location of the tag 4 when it passes within the field of view of the particular camera. The video scene data from each camera is also routed by way of memory units 7 (7', 7") to control means 8 which, in addition to the other functions hereinafter described, is effective, in response to signals from the target identification means 6 and under circumstances where the target has been identified (and the specific tag thus located) by more than one camera, to process only that tag data viewed by the camera having the best and largest image of the tag.

The control means 8 is also effective to electronically transform the image of the data on the face of the detected tag 4 to the desired configuration and orientation (for example, to the format like that shown in FIG. 2) and thereafter, using OCR techniques, to read the destination data contained within the information field 5. This destination data is then inputted to a diverter controller 9 which is effective to automatically and appropriately actuate the diverter of the baggage handling conveyor assembly (FIG. 1) to direct the luggage 3 along the correct path as directed by the destination data read from the luggage tag.

In summary, therefore, the basic sequential steps carried out by the process and control of the present invention are:

(1) Identify the uniquely configured target, thereby identifying the presence and location of the luggage tag;
(2) Electronically transform the video data corresponding to the information on the face of the detected tag to the desired orientation and configuration;
(3) Electronically read the destination data adjacent to the target; and
(4) Direct the baggage carrying the tag along a path determined by the destination data electronically read from the tag.

TARGET IDENTIFICATION

The target identification process basically involves the comparison of the video scene data from each of the cameras with data corresponding to the characteristics of the uniquely configured target symbol 10. Since the specific disclosed target comprises a sequence of adjacent bars and spaces of specific and known relative widths, the approach contemplated by the invention is to initially appropriately binarize the incoming video data to render the various pixels as a sequence of bars and spaces, to then electronically "measure" the width of these binarized bars and spaces, and thereafter compare the relative widths of these bars and spaces with the bar/space width characteristics of the specific known target 10. As a particular feature of this process, since the energy density at the photosites of the camera varies as a function of not only the illuminance at the tag but also the camera-tag distance, it may be preferable to use adaptive, rather than fixed threshold comparative, binarization of the incoming data.

Consequently, in accordance with the process, the incoming video scene data is adaptively binarized in real time to detect black-to-white and white-to-black transitions, i.e. in the case of a candidate target, to identify the bar/space transitions thereo. The next step of the process is to measure the widths of these detected bars and spaces, followed by appropriate comparison of such widths with the widths of the bars and spaces of the reference target 10. A "match" between such data is then indicative that the target 10 (and hence tag 4) has been detected. Various techniques, if desired, may then be employed for validating such match.

Figure 4:
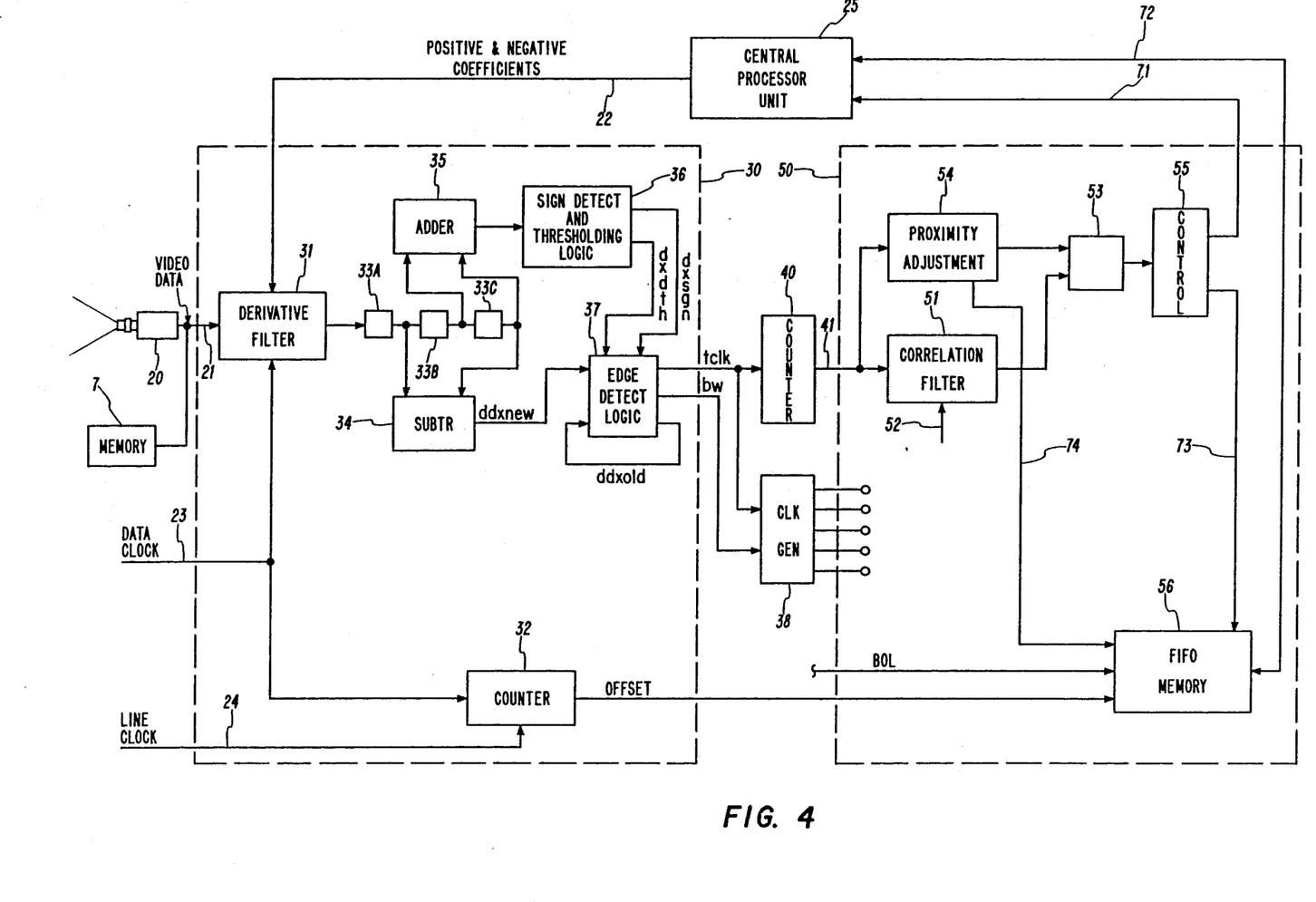
FIG. 4 is a block diagram schematic illustrating a preferred embodiment of the target identification network illustrated in FIG. 3.

A block diagram schematic of a preferred embodiment of the system for implementing the target identification step is depicted in FIG. 4. Accordingly, video data generated from the line scan camera 20 is inputted by way of data line 21 to an edge detector network 30. Concurrently, the video data is also transferred by a local bus to, for storage in, memory unit 7.

The camera 20 will normally have associated therewith conventional digital, bias/gain, and scaling circuitry so that the video data appearing on line 21 actually constitutes digitized binary signals, which have been appropriately adjusted for correct bias and gain as well as appropriate scaling, these binary signals corresponding to the sequence of gray level values of the "scene" (pixels) comprising the field of view of the camera. Under the circumstances where the target 10 becomes part of that scene, the video data representative of the target would thus constitute binary signals corresponding to the black bars 11, 11', 11'', etc. and spaces 12, 12', 12'', etc. (FIG. 2). At this point in time, however, it is to be understood that the target scanned by the camera 20 is only a candidate target, not yet having been identified as the known target 10.

The function and purpose of the edge detector network 30 is to locate the black-to-white and white-to-black transitions, i.e. in the case of the candidate target, the bar/space interfaces, the output signals from the network 30 (representing such transitions) then being input to, for resetting of, a counter 40. The counter 40 is effective to generate signals at its output representative of the respective widths of the detected bars and spaces, these signals being inputted (by way of data line 41) to a target matching network 50. The purpose of the target matching network 50 is to compare the width data appearing on the data line 41 with stored data representative of the unique characteristics of the target 10 and to generate a signal (on the output data line 71) in the event of a "match", i.e. signifying the detection and identification of the actual target 10.

The operation of the video camera 20, the edge detector network 30, counter 40, and target matching network 50, as well as coordination of the various functions discussed hereinafter, are all under the supervision and control of a central processor unit 25 (which provides the functions of control means 8). While various types of equipment may be utilized for the CPU 25, one preferred type is the single board computer iSBC 286/10 produced by Intel Corporation of Santa Clara, Calif.

The edge detector network 30 includes a derivative filter 31, the function of which is to generate a signal at its output representative of the instantaneous rate of change of scene reflectance with respect to its position in the scan. The filter 31, in a preferred embodiment, comprises two interconnected digital filter/correlator chips, for example those presently produced by TRW Inc. of La Jolla, Calif. under the designation TDC-1028. The positive and negative coefficients are inputted to the filter 31 by the CPU 25 by way of data line 22.

Inputs to the edge detector network 30 also include the data clock signals on line 23, the line clock signals on line 24, and the beginning of line (BOL) address which specifies the address in memory where the beginning of each new scan line from the camera 20 is stored.

The edge detector network 30 also comprises a counter 32 which is clocked by the data clock signals on line 23 and reset by the line clock signals on data line 24. The counter 32 therefore generates, at its output, signal data corresponding to the offset within a line of the pixel which is being inputted (by way of data line 21) to the derivative filter 31. In the instance where the target 10 is detected by the matching network 50, this "offset" is stored in a section of the memory 56 of the matching network 50 for subsequent input to the central processor unit 25, all as subsequently described in greater detail.

The output derivative filter 31 is coupled to three sequential delay registers 33A, 33B, and 33C. The data at the output of delay registers 33A and 33C are coupled to a conventional subtractor 34, the output signal *ddxnew* of which corresponds to the second derivative of the incoming video data signal. This signal is then applied as one input to the edge detection logic network 37.

The output of delay registers 33B and 33C are coupled to, and summed within, a conventional adder network 35, the output of which corresponds to the first derivative of the video data signal. The output of adder 35 is coupled to a sign detect and thresholding logic network 36 which generates an output signal *dxsgn* (constituting the sign of the derivative) and a flag signal *dxdth* (which constitutes a binary "1" when the absolute value of the derivative is greater than a pre-set threshold. The three signals *ddxnew; dxdth, dxsgn;* and a fourth signal *ddxold* (being a delayed version of *ddxnew*) are then inputted to edge detector logic 37. Edge detector logic network 37, in a preferred embodiment, comprises a single integrated fuse logic (IFL) device having internal feedback capability.

The edge detection logic network 37 is effective to generate a first output signal *tclk* which has a binary value "1" when either a black-to-white *or* white-to-black transition is detected, as well as a second output flag signal *bw* which constitutes a binary "1" if the transition is white-to-black and "0" if the transition is black-to-white.

In summary, therefore, the overall edge detector network 30, in response to the incoming video data signals, generates a signal (*tclk*) indicative of the presence of a black-to-white or white-to-black transition (bar/space interface and a signal (*bw*) indicative of the specific type of transition (i.e. bar-to-space or space-to-bar).

The counter 40 is effective to actually measure the distances between the black-to-white and white-to-black transitions which, in the case of a candidate target, means measuring the widths of the bars and spaces of that target. Accordingly, the counter 40 is reset each time that the signal *tclk* goes "high", indicating the occurrence of a transition, the duration of the signal at the output of counter 40 (on data line 41) thus being representative of the distance between transitions, i.e. the width of the bar or space, as the case may be, most recently detected. The counter can be of any configuration known to those skilled in the art; and in the preferred embodiment, utilizes a programmably array logic (PAL) device.

Since the black-to-white and white-to-black transitions of the video data will occur at uneven intervals, the clock signal furnished to the various components of the target matching network 50 will necessarily be irregular. Accordingly, these clock signals are provided by the clock generator 38 in response to signals *tclk* and *bw* inputted thereto, as shown in FIG. 4.

As previously discussed, the purpose of the target matching network 50 is to compare the signal information appearing on the data line 41 (representing the "candidate target") with stored information representative of the unique characteristic of the reference target 10 in order to determine whether there is a "match". Specifically, the network 50 compares the sequential bar/space width data (or ratios) appearing at the output of the counter 40 with the sequential bar/space widths (or ratios) of the target 10, the network for implementing such now being described in greater detail.

Accordingly, the target matching network 50 includes a correlation filter 51, the filter 51 having inputted thereto (on data line 52) a binary signal (from CPU 25 representative of the bar/space widths of the target 10, such signal thus constituting the reference pattern of such target. As previously indicated, the reference pattern (or width ratios) for the particular target 10 shown in FIG. 2 would be 2,1,1,1,3,1,1,1,2.

Coupled to the output of the correlation filter 51 is a "match" signal generator 53 which is effective to generate an appropriate signal, for example a logic "1", at its output when the bar/space width characteristics of the data stream on data line 41 matches the bar/space width data of the reference pattern inputted to the correlation filter. As an additional advantageous feature, if desired, and in order to accommodate the fact that the perceived width of the respective bars and spaces may vary as a function of the proximity (distance and angular orientation) of the camera to the tag 4, suitably designed proximity adjustment means 54 is provided to make appropriate adjustments for such variable. Accordingly, the data appearing at data line 41 is routed through both the correlation filter 51 and the proximity adjustment means 54 so that the signal generator 53 is responsive to the "proximity adjusted" data to assure the generation of the "match" signal at the output means 53 when the actual and true target is presented in the field of view of one (or more) of the cameras 20.

Also included as part of the target matching network 50 is a first-in/first-out (FIFO) memory means 56 in data communication with the central processing unit 25 by way of data line 72, as well as in data communication (by way of data line 73) with control means 55. The control means 55 is effective, in response to a "match" signal from generator 53, to generate an "interrupt" signal to the CPU 25, as well as to instruct memory 56 (by way of data line 73) to store the relevant information in memory as a consequence of this match. Such relevant information, which is then read by the CPU 25 by way of data line 72, includes the offset data then existing from the output of counter 32 and the BOL (beginning of line) address. Furthermore, in accordance with a particular advantageous feature of the preferred embodiment, an additional item of relevant information inputted to the memory 56 (by way of data line 74) is a data signal from proximity adjustment means representative of the relative size of the detected target. Therefore, since a target identification network like that depicted in FIG. 4 is associated with each camera (20, 20', 20''), under those circumstances where more than one camera identifies the target 10, the CPU 25 will select that camera having the largest image of the target, and thus the tag, for subsequent orientation and reading of the tag destination information viewed by that camera.

TAG DATA TRANSFORMATION

Since the tags, and consequently the image of the target and tag destination data (within the field 5) will in most instances be at random orientations from the horizontal orientation shown in FIG. 2, OCR reading of such tag destination data will be facilitated by an initial electronic transformation of the viewed image. For example, the captured image of the target may appear in the configuration and orientation like that shown in FIG. 5A (the image of the adjacent destination data being similarly distorted and askewed); and in accordance with a feature of the invention, the image of the target is electronically rotated, sized, and configured to appear as that shown in FIG. 5B, such electronic transformation being similarly applied so that the image of the adjacent tag destination data (airport designation "DFW" and flight number "44") appears like that shown in FIG. 5B.

In accordance with a preferred embodiment, the aforementioned transformation is carried out by the CPU 25 using software implemented algorithms which "locate" the corners of the target 10 and compute an affine transformation to a standardized view. Specifically, and with reference to FIG. 5A, the horizontal scan line 80 is recognized by the target identification network (FIG. 4) as defining the proper ratio of bar and space widths of the reference target, the pixel 81 representing the intersection of the scan line and the rightmost boundary line 82 of the target also being identified by such network. After the interrupt signal is issued to CPU 25, as previously described, the CPU 25 will read from the FIFO memory 56 address of pixel 81 and the width of the target depicted in FIG. 5A as intersected by scan line 80.

Figure 5A:
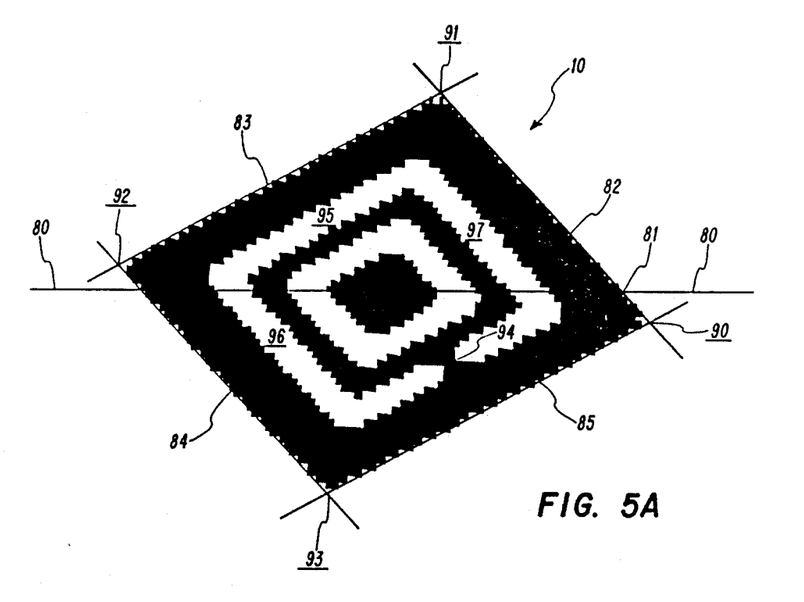
FIGS. 5A and 5B are illustrations depicting the electronic transformation of the video image from the face of the tag of the desired orientation and configuration.
Figure 5B:
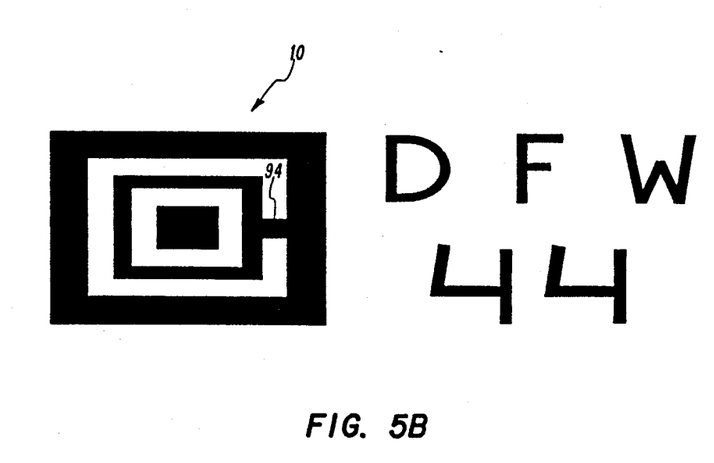

The CPU 25 then reads from memory the gray levels of that portion of the target image represented by the intersection of the target 10 and scan line 80; and the binarization threshold is set based upon these gray level values. The boundary of the target 10 is then traversed in the counterclockwise direction, using an appropriate edge following algorithm (such as the Freeman direction code), along the boundary lines 82, 83, 84, and 85; and a record of all edge or boundary pixel coordinates is maintained.

Next, using an appropriate corner detection algorithm, the approximate locations of the four corners 90, 91, 92, and 93 of the target are detected. With this information, the boundary pixels of the target can be represented as four uniquely defined sets, each set respectively corresponding to the four straight line segments defining the target boundary. Standard numerical linear algebra techniques are then used to calculate the equations of the least squares estimates of these line segments.

Next, a standard numerical algorithm for solving linear equations is used to compute the actual coordinates of the corners 90–93 of the target. Standard linear algebra techniques are then used to determine the affine transformation which maps the boundary parallelogram of the target depicted in FIG. 5A to a square symbol of predetermined size. Using this mapping, the gray levels of the image at locations 94, 95, 96, and 97 are retrieved from memory; and the specific orientation mark at location 94 is detected. Using the mark at location 94 as a reference point, and with use of the original affine transformation, the entire image is electronically rotated (and sized and configured) to that shown at FIG. 5B with the tag destination data (DFW 44) now oriented and configured for electronic reading by OCR techniques.

TAG DESTINATION DATA READING

The tag destination data corresponding to that contained with the field 5 (FIG. 2) can be read by any one of a number of optical character recognition (OCR) techniques presently known to those skilled in the art. Using such techniques, the scanned data within the field 5 is converted to alphanumeric information representative of the airport destination (for example, DFW), the flight number (e.g. 44), as well as other identifying data which may be prepositioned with respect to the target 10, such as airline identification, bag i.d. number, etc. Such information is then transmitted to the diverter controller 9 (FIG. 3) for appropriate routing of the baggage 3 by the baggage handling conveyor assembly (FIG. 1).

BAGGAGE ROUTING

As previously mentioned, a diverter located at diverter location 2 (FIG. 1) is effective, under supervision of the diverter controller 9, to direct each piece of baggage along the transport path (1a, 1b, 1c etc.) representing the intended destination of that baggage as indicated by the destination data on its respective tag. The diverter controller 9 may be any one of a conventionally designed computer, programamable logic controller, or equivalent device which, among other functions, receives the tag destination data; compares it to stored appropriate location identifiers; and, at the proper time, issues diverter control commands to the diverter device (at the location 2) when the particular bag arrives at such location. The diverter is activated to cause the bag to be routed to the particular branch conveyor (or chute, bin, or other suitable accumulator, as the case may be). Once delivered to the proper accumulation point, the bag is then made available for manual or automated loading onto baggage carts or aircraft containers for the specified flight. Various types of presently known diverters may be utilized for this purpose, for example the pusher mechanism disclosed in U.S. Pat. No. 4,441,604.

Various modifications to the disclosed embodiment, as well as alternate embodiments, of the invention may be become apparent to those skilled in the art without departing from the spirit and scope of the invention as defined by the appended claims.

What is claimed is:

1. In an article handling system of the type having transport means for transporting articles along respectively different transport paths, the improvement comprising:
    (a) means associated with each of said articles bearing data representative of the intended destination of said article,
    (b) a uniquely configured target symbol of predetermined and known characteristics immediately adjacent said destination data, said target symbol including a set of geometrically similar parallelograms of contrasting colors superimposed in mutually concentric relation which, when intersected by a line through its center, defines a sequence of contrasting bars and spaces, said bars and spaces having predetermined widths along said center line,
    (c) means responsive to the respective width ratios of adjacent bars and spaces for initially detecting the presence of said target symbol and thereafter reading the intended destination data adjacent said detected symbol, and
    (d) control means responsive to the so read intended destination data for directing each article along a transport path corresponding to said intended destination.

2. The improvement as defined in claim 1 wherein said data is human readable.

3. The improvement as defined in claim 1 further comprising electronic means for determining the width ratio sequence of adjacent bars and spaces of said detected target symbol and comparing said determined sequence with a known width ratio sequence of adjacent bars and spaces of a reference target symbol, thereby to identify said uniquely configured target symbol.

4. An automated baggage handling system, comprising:
    (a) transport means for transporting baggage items along different transport paths corresponding to respectively different intended destinations of said baggage items,
    (b) tag means affixed to each baggage item bearing data representative of the intended destination of said baggage item, said data being both machine and human readable,
    (c) said tag means further bearing a uniquely configured target symbol immediately adjacent said intended destination data, said symbol having predetermined and known characteristics,
    (d) camera means including a plurality of video cameras disposed adjacent said transport means, each video camera being directed to capture the image of information on tag means passing within its field of view,
    (e) target identification means coupled with each video camera for detecting the presence of said target symbol within said field of view,
    (f) means coupled to said target identification means for reading the intended destination data viewed by only that video camera having the largest image of said target symbol,
    (g) optical character recognition means for reading said intended destination data, and
    (h) control means responsive to the data read by said optical character recognition means for directing the baggage item along the transport paths corresponding to the intended destination of that baggage item.

5. The automated baggage handling system as defined by claim 4 further comprising electronic means for transforming the image of the target symbol detected by the target identification means to a desired orientation.

6. The automated baggage handling system as defined by claim 4 wherein the reading of said intended destination data by said optical character recognition means is dependent upon the initial detection of the presence of said target symbol by said target identification means.

7. The automated baggage handling system as defined by claim 4 wherein said target identification means comprises electronic means for comparing the characteristics of the image captured by said camera means with the predetermined and known characteristics of a reference symbol.

8. A method of automatically routing articles to respectively different destinations, said method comprising:
    (a) affixing tags to each of said articles, each tag bearing human readable data representative of the intended destination of that article as well as bearing a target symbol of predetermined and known characteristics adjacent said data,
    (b) identifying the data presence and a reference direction of said target symbol on said tags,
    (c) thereafter electronically transforming the image of the so identified target symbol to an image of desired configuration and orientation,
    (d) thereafter machine reading the intended destination data adjacent the transformed image of the said target symbol, and (e) routing the baggage to the destination corresponding to the so read intended destination data.

9. Automated baggage handling system, comprising:
(a) transport means for transporting baggage items along different transport paths corresponding to respectively different intended destinations of said baggage items,
(b) tag means affixed to each baggage item bearing human readable alphanumeric data representative of the intended destination of said baggage item,
(c) said tag means further bearing a uniquely configured target symbol immediately adjacent said intended destination data, said symbol having predetermined and known characteristics,
(d) first camera means disposed adjacent said transport means for capturing and digitizing the image of scenes within its field of view,
(e) means for comparing the so digitized image with data representative of a reference target symbol,
(f) means solely responsive to a match between the digitized image and data representative of the reference target symbol for subsequently processing the intended destination data adjacent said target symbol, said processing including the optical character recognition of said alphanumeric data, and
(g) control means responsive to the optical character recognition of said alphanumeric data for directing the baggage item along a transport path corresponding to said alphanumeric data.

10. An automated baggage handling system, comprising:
(a) transport means for transporting baggage items along different transport paths corresponding to respectively different intended destinations of said baggage items,
(b) tag means affixed to each baggage item bearing data representative of the intended destination of said baggage item, said data being both machine and human readable,
(c) said tag means further bearing a uniquely configured target symbol immediately adjacent said intended destination data, said target symbol having a plurality of contrasting squares superimposed in mutually concentric relation which, when intersected by a line through its center, defines a sequence of contrasting bars and spaces, said bars and spaces having predetermined widths along said center line,
(d) camera means disposed adjacent said transport means so directed to scan tag means passing within its field of view,
(e) target identification means coupled with said camera means for detecting the presence of said target symbol within said field of view, said target identification means including means for determining the width sequence of adjacent bars and spaces of said detected target symbol and comparing said determined sequence with a known width sequence of adjacent bars and spaces of a reference target symbol, thereby to identify said uniquely configured target symbol,
(f) means responsive to said determined width sequence of said detected target symbol for transforming the detected images of the target symbol and of the intended destination data to a desired orientation for presentation to optical character recognition means,
(g) optical character recognition means for reading said transformed intended destination data, and
(h) control means responsive to the data read by said optical character recognition means for directing the baggage item along the transport paths corresponding to the intended destination of that baggage item.

* * * * *

UNITED STATES PATENT AND TRADEMARK OFFICE
CERTIFICATE OF CORRECTION

PATENT NO. : 4,776,464

DATED : October 11, 1988

INVENTOR(S) : Dale D. Miller and Kenneth S. Goldstein

It is certified that error appears in the above-identified patent and that said Letters Patent is hereby corrected as shown below:

Column 10, Line 52, after "reference" and before "symbol" insert -- target --.

Column 10, Line 61, after "identifying" insert -- from an image of said tags --; insert -- orientation -- after "and".

Column 10, Lines 61 & 62, delete "a reference direction".

Column 10, Line 62, delete "on said tags".

Column 11, Line 1, delete "baggage" and insert -- article -- after "routing the".

Claim 11 has been omitted and should read:

-- 11. An article handling system, comprising:
    (a) transport means for transporting articles along different transport paths corresponding to respectively different intended destinations of said articles,
    (b) tag means affixed to each article bearing human readable data representative of the intended destination of said article,
    (c) said tag means further bearing a uniquely configured target symbol immediately adjacent said intended destination data, said symbol having predetermined and known characteristics,
    (d) first camera means disposed adjacent said transport means for capturing and digitizing the image of scenes within its field of view,

UNITED STATES PATENT AND TRADEMARK OFFICE
CERTIFICATE OF CORRECTION

PATENT NO. : 4,776,464

DATED : October 11, 1988

INVENTOR(S) : Dale D. Miller and Kenneth S. Goldstein

It is certified that error appears in the above-identified patent and that said Letters Patent is hereby corrected as shown below:

(e) means for comparing the so digitized image with data representative of a reference target symbol,     (f) means solely responsive to a match between the digitized image and data representative of the reference target symbol for subsequently processing the intended destination data adjacent said target symbol, said processing including the optical character recognition of said human readable data, and     (g) control means responsive to the optical character recognition of said human readable data for directing the article along a transport path corresponding to said human readable data. --

Signed and Sealed this

Twenty-eighth Day of March, 1989

Attest:

DONALD J. QUIGG

*Attesting Officer*      *Commissioner of Patents and Trademarks*